United States Patent [19]
Haines

[11] 3,968,631
[45] July 13, 1976

[54] FRUIT PICKING DEVICE
[76] Inventor: Delmar C. Haines, Box 112, 401 N. State St., Saybrook, Ill. 61770
[22] Filed: Oct. 8, 1975
[21] Appl. No.: 620,699

[52] U.S. Cl. ............................................. 56/328 R
[51] Int. Cl.² ....................................... A01D 46/00
[58] Field of Search ................... 56/328 R, 332–340

[56] References Cited
UNITED STATES PATENTS

| | | | |
|---|---|---|---|
| 3,404,521 | 10/1968 | Thorn et al. | 56/328 R |
| 3,541,772 | 11/1970 | Miller | 56/328 R |
| 3,552,107 | 1/1971 | Swift | 56/328 R |

Primary Examiner—Russell R. Kinsey
Attorney, Agent, or Firm—Silverman & Cass, Ltd.

[57] ABSTRACT

A rotatable assembly having a plurality of groups of three outstanding finger members spaced along an elongate drum of generally rectangular cross-sectional configuration. Two of each group of finger members are located in a common plane and the third intermediate finger member lies in a plane staggered relative to the plane of the said two finger members. The assembly is caused to rotate so that the finger members will contact fruit to be picked from a tree or the like. The fruit first contacts one finger member and is wedged between it and a next adjacent finger member lying in the same plane. As the assembly continues to rotate, the fruit is pivoted by reason of being wedged between the fingers, to twist the fruit relative its stem and enhance removal from the tree.

13 Claims, 9 Drawing Figures

FRUIT PICKING DEVICE

BACKGROUND OF THE INVENTION

1. Field of the Invention

This invention relates generally to apparatus for picking fruit from a tree or the like upon which the fruit is grown, and more particularly, to such an apparatus having a staggered arrangement of finger members to effect twisting of the fruit relative its stem during picking thereof.

2. Description of the Prior Art

Various types of apparatus for picking or harvesting fruit from trees or the like are known in the art. Early types of fruit picking machines were of the vibratory type including power driven means for shaking the tree or branches thereof to free the fruit for accummulation by a separate harvester. These vibratory types are undesirable because they induce damage to the trees and/or fruit to be picked. Improved fruit picker machines include a picking head to be positioned proximate the tree for contact with the fruit by picking devices which contact the fruit and cause separation thereof from the tree. Examples of the latter type of apparatus are disclosed in U.S. Pat. Nos. 3,404,521, 3,522,696 and 3,651,627. In each of these patents, the fruit picking apparatus includes a picking head with finger or tine members to contact the fruit and free the same from the tree branches. In U.S. Pat. No. 3,651,627, the head is caused to vibrate while the tines contact the fruit; the disadvantages of the earlier known vibrators are not completely eliminated by this device. In U.S. Pat. No. 3,522,696 a harvesting apparatus is moved past the tree having the fruit to be picked while tines come in contact therewith. The structure of this patent is such that the fruit is torn from its branches with the disadvantage that the fruit itself may be damaged in the picking operation. In U.S. Pat. No. 3,404,521, a picking head is rotated among the branches of a fruit tree; finger members contact the fruit to pull the same from its branches. The structure of this patent requires fingers which are movable relative to the drum on which they are mounted requiring a complex arrangement of parts with attendant disadvantages.

SUMMARY OF THE INVENTION

The present invention is of the non-vibratory type having an improved arrangement of rotatable picker head drum and finger member assembly. The finger members or tines of the invention are positioned in staggered arrangement on removable plates. There are a plurality of groups of three outstanding finger members on a plurality of such plates which are mounted on the drum. The staggered arrangement of the fingers is such that when the picker head is rotated among the branches of a tree having fruit to be picked, the fruit will contact a finger and become wedged between it and a next adjacent finger; continued rotation of the head will cause twisting of the fruit relative to its stem gently to separate the fruit therefrom. By reason of the twisting action of the fingers with respect to the fruit, the fruit is separated with little damage thereto. The interchangeability of the plates on which the finger members are positioned enables easy adaption of the assembly to different size finger members or ones with different spacing therebetween; variations thereby easily are effected to adapt the apparatus for picking different size fruit.

DESCRIPTION OF THE PREFERRED EMBODIMENT

Figure 1:
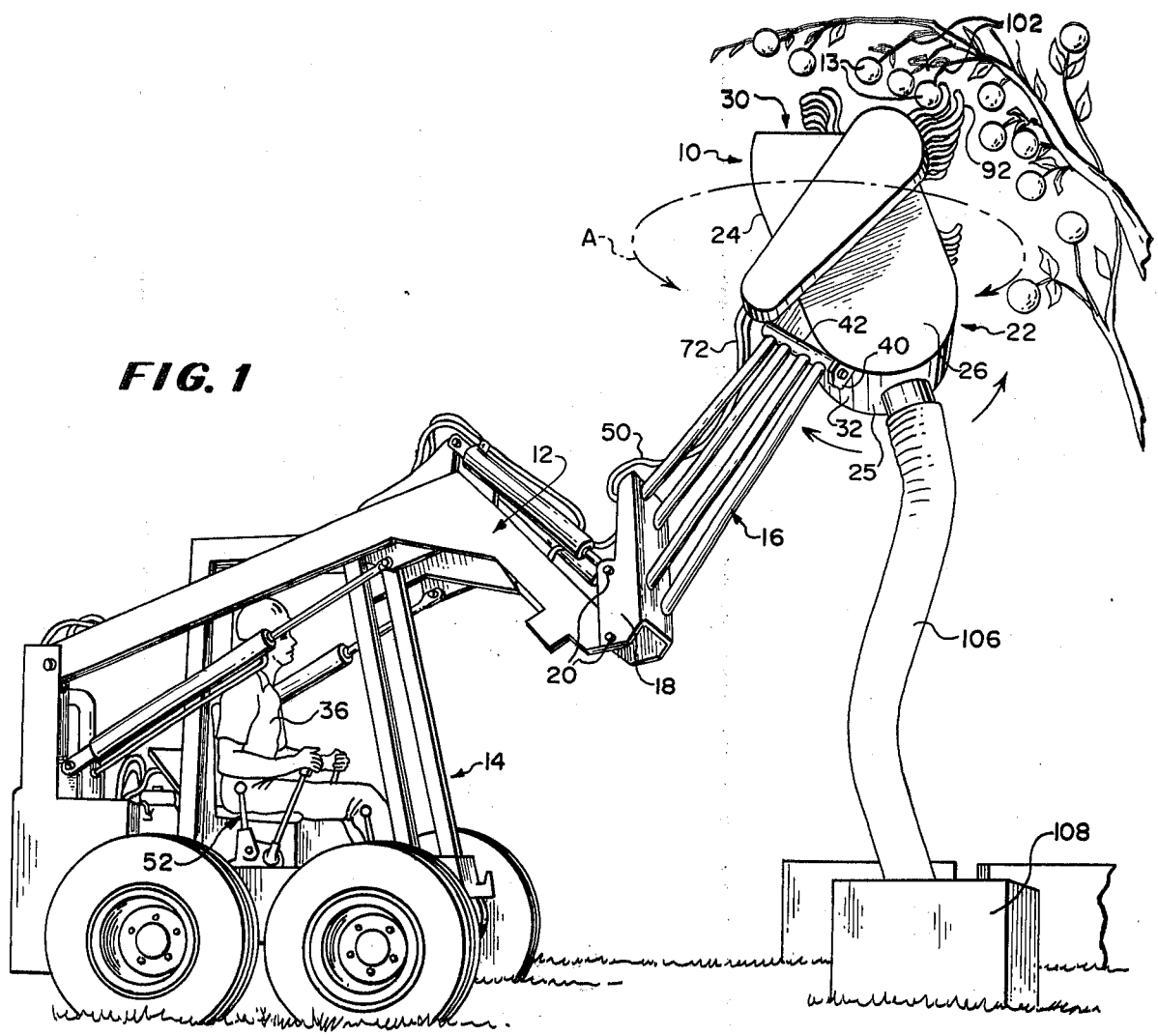
FIG. 1 is a perspective view of the fruit picking device of the invention operatively mounted on a tractor lift vehicle and showing the same in contact with a tree having fruit to be picked.

Referring to FIG. 1, the fruit picking apparatus 10 is shown mounted on the boom 12 of a tractor 14 having fittings operable to raise the apparatus 10 and rotate the same for contact with the fruit 13 hanging from the branches of a tree. The tractor 14 is of any conventional type which is adapted to mount the apparatus 10. In the illustration, the apparatus boom 16 is secured to the tractor boom 12 by connection of the two booms with mounting plate 18 therebetween. The entire apparatus 10 and boom 16 is separable from the tractor by removing bolts 20 securing the plate 18 to the tractor boom. Thus, the tractor is shown for purposes of illustration only as an example of a wheeled vehicle upon which the apparatus 10 may be mounted. Any alternate type of platform or vehicle or even a stationary mounting device could be used to raise the apparatus 10 into the operation position illustrated.

Figure 2:
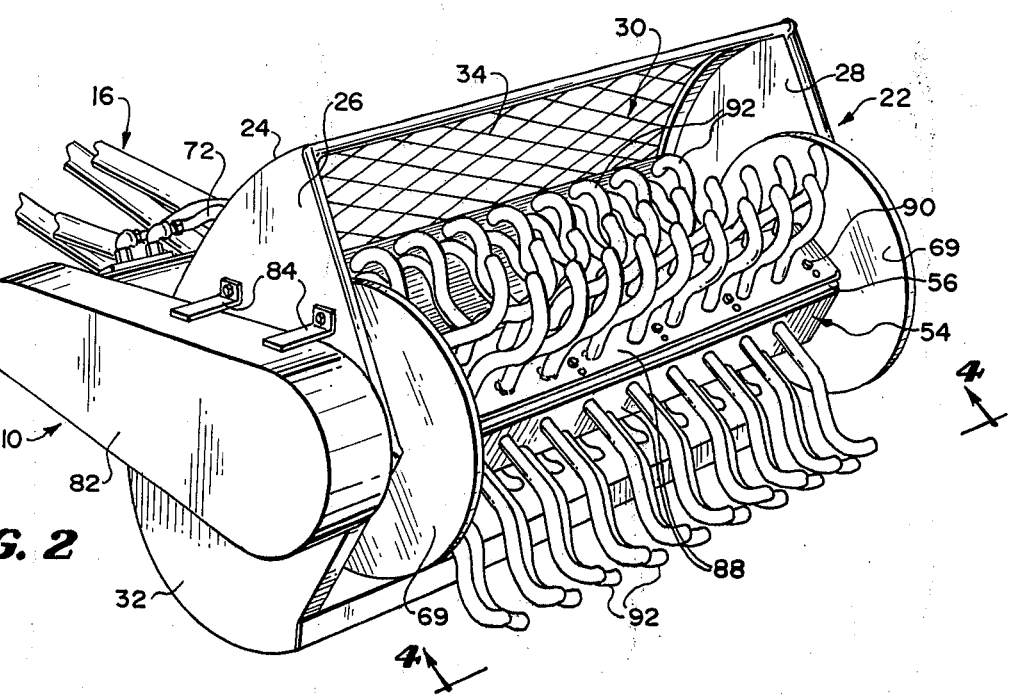
FIG. 2 is an enlarged fragmentary front perspective view of the picker head assembly.
Figure 3:
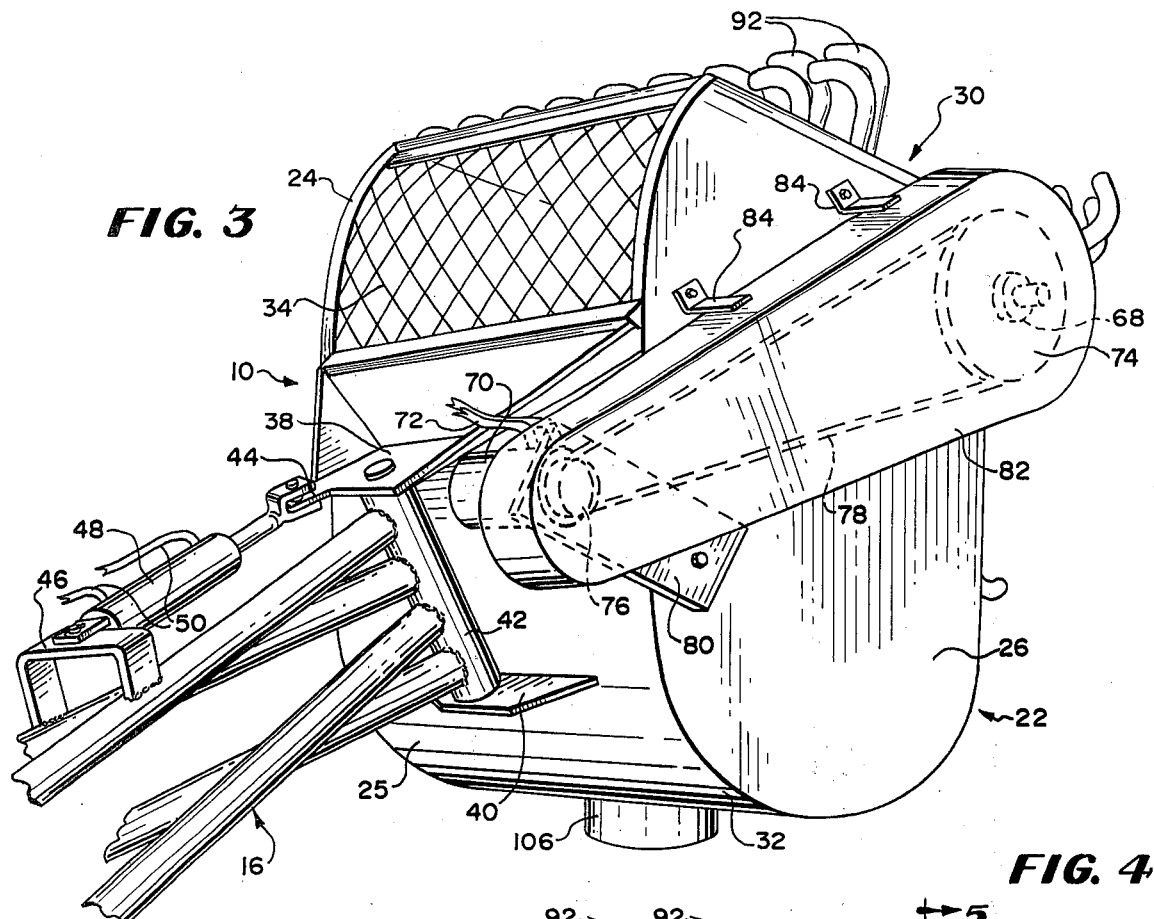
FIG. 3 is a fragmentary rear perspective view thereof.
Figure 5:
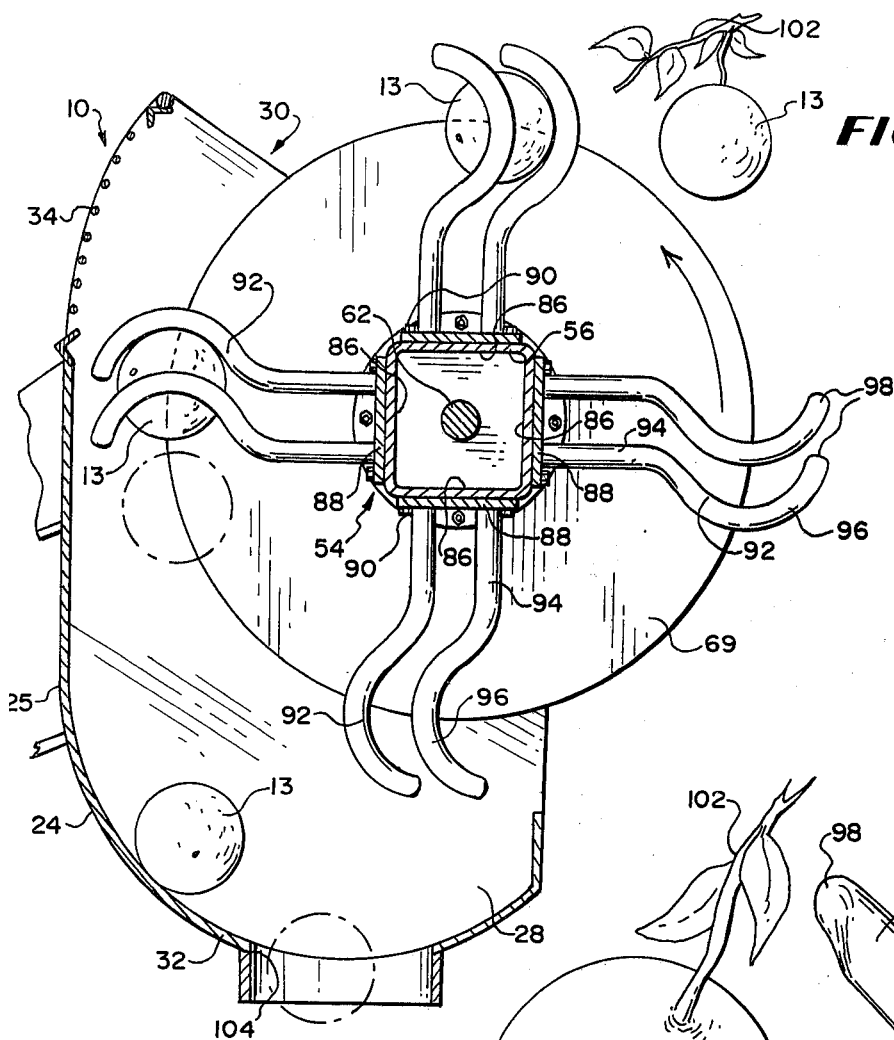
FIG. 5 is a sectional view taken along the line 5—5 of FIG. 4 in the direction indicated generally, and showing a fruit in the several steps of picking same.

As illustrated most clearly in FIGS. 2, 3, and 5, apparatus 10 includes a picker head assembly 22 having a housing 24 formed of a generally curved rear and bottom wall member 25 and end plate members 26, 28 closing the sides of the member 25. The housing 24 thereby has an open mouth 30 and a substantially closed end 32 opposite the mouth 30. The closed end 32 formed by the bottom portion of wall member 25 and end plates 26, 28 forms a fruit catching container into which picked fruit will fall in operation of the apparatus. The uppermost portion of wall 25 of housing 24 is formed of wire mesh material 34 to permit the operation 36 of the tractor 14 to observe operation of apparatus 10 as fruit is being picked. If desired, the entire wall 25 and also end plates 26, 28 could be formed of such mesh material to permit viewing from any location of the apparatus in operation.

Assembly 22 is mounted on boom 16 of apparatus 10 by plates 38, 40 secured to wall member 25 by weldment, for example. A pivot member 42 connected to the boom 16 is positioned between plates 38, 40 and extends therethrough in apertures provided therein to enable assembly 22 to pivot or swivel in a generally horizontal plane as shown by the arrow A in FIG. 1. Plate 38 is provided with a flange part 44 and boom 16 is formed with a bracket member 46 between which a hydraulic piston 48 is secured to effect the pivoting of assembly 22; control for the operation of piston 48 is provided by fluid lines 50 extending to the operation members 52 on the tractor 14.

The picker head assembly 22 is provided with a rotatable finger plate assembly 54 for performing the actual picking operation of the fruit 13. Plate assembly 54 includes a continuous drum 56 of generally square-shaped cross-sectional configuration with closed end walls 58, 60. The end walls 58, 60 rigidly mount a central shaft 62 passing through the drum 56 and extending beyond the extremities thereof. The ends 64, 66 of shaft 62 are journaled in respective passageways through end plates 26, 28 by conventional bushings 68. Finger plate assembly 54 thereby freely is rotatable within head assembly 22. End guard plates 69 are secured to the ends of drum 56 to guide the fruit to be picked into the housing 24 and prevent the picked fruit from rolling off the sides of assembly 22.

Drive for rotating the plate assembly 54 is provided by any suitable means such as hydraulic motor 70 which is controlled by fluid lines 72 connected with operation members 52. End 64 of shaft 62 carries a follower wheel 74 connected to drive wheel 76 of motor 70 by a pulley belt 78. Motor 70 is mounted to assembly 22 on end plate 26 with bracket 80; a protective cover 82 is positioned over the motor, pulley belt and follower wheel and secured to the end plate 26 by brackets and bolts 84 so as to prevent damage to these operational portions of the assembly.

The elongate drum 56 is fitted on each of the four sides 86 thereof, with a respective plate 88 of dimension corresponding substantially with a side 86. Each plate 88, of which all are identical and therefore only one will be described in detail, is secured to the respective side 86 of the drum by nuts 90 retained on bolts fitted on the sides of the drum. The bolts pass through passageways formed in the plates for registry with the bolts. Thus, the plates 88 may be removed from the drum 56 by removing the nuts 90.

Each plate 88 has formed integral therewith or permanently secured thereto by weldment, for example, a plurality of fruit picking fingers 92. Each finger 92 is of circular cross-sectional configuration and extends generally normal to the plane of plate 88. The fingers 92 comprise a substantially straight portion 94 joined to the plate and a generally curved portion 96 formed as an extension of the straight portion 94. The curved portion 96 is of substantially semi-circular configuration. The terminal or leading end 98 of each finger is flattened or pinched to form a reduced diameter part to permit the fingers easily to pass through the branches of a tree upon initial contact with a fruit to be picked; the terminal end 98 is rounded or blunted to prevent damage to the fruit.

Figure 4:
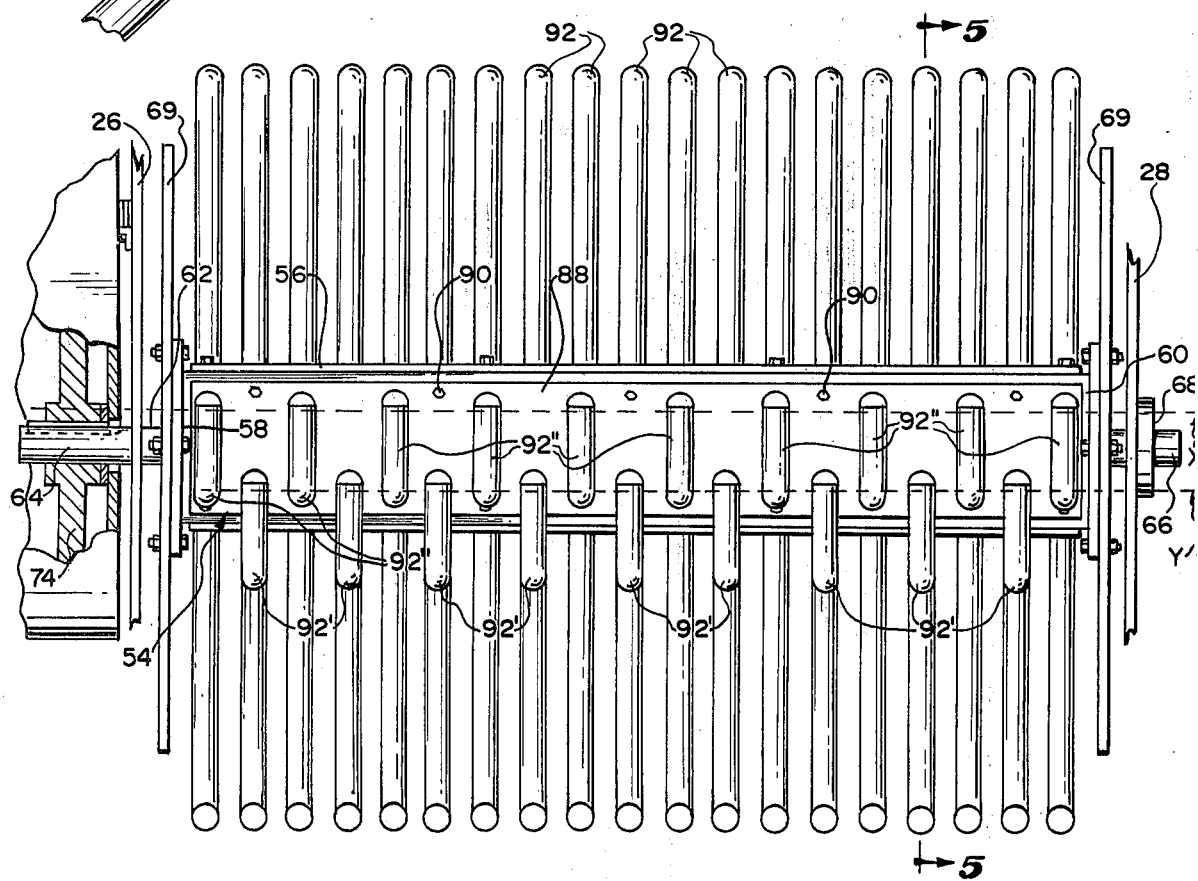
FIG. 4 is a sectional view taken along the line 4—4 of FIG. 2 in the direction indicated generally.

The straight portions 94 of fingers 92 are affixed to plate 88 by weldment 95 along two parallel lines (shown as dotted lines $x$ and $y$ in FIGS. 4 and 6) extending the length of the plate such that there is one group of fingers, designated 92' in FIG. 4, disposed along the line $y$ and a second group of fingers designated 92'' disposed along the line $x$ parallel to that of fingers 92'. Fingers 92' thereby are positioned staggered from fingers 92'' to provide a space between each adjacent finger. The orientation of the fingers 92 is such that the points at which any three adjacent fingers are joined to the plate 88 form the apexes of a triangle. As best seen in FIGS. 6–9, finger 92' forms one of said apexes, and fingers 92'' form the other two referred-to apexes. It is to be understood that the next group of three fingers (not shown in FIGS. 7–9, and only partially shown in FIG. 6) form similar triangular configurations on the plate 88, and this is the case along the entire length of the plate. Each adjacent finger 92 therefore is spaced from the other along the longitudinal direction of plate 88, and staggered from the other along the transverse direction of the plate. Consequently, a space 100 (FIG. 7) is provided between two adjacent fingers (92'' in FIG. 7), the transverse dimension of the space 100 being such as to enable picking of fruit as described below.

Figure 6:
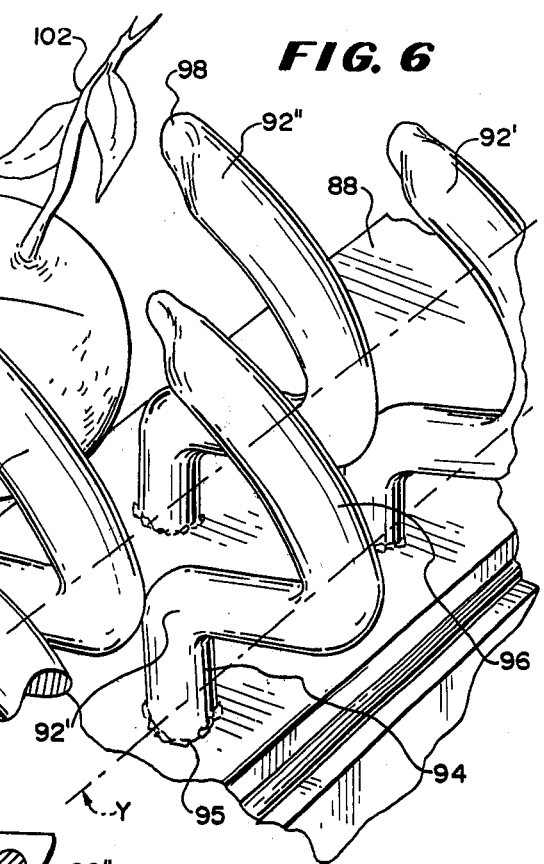
FIG. 6 is an enlarged fragmentary perspective view of the finger members of the invention with a fruit associated therewith as the same is being picked.
Figure 7:
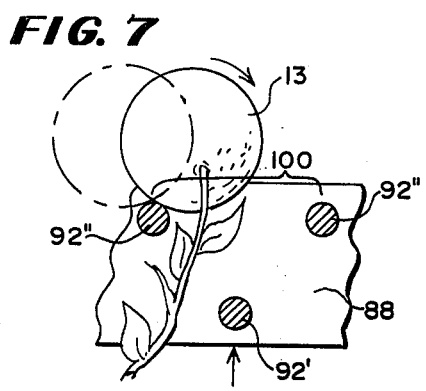
FIG. 7 is a diagrammatic view showing the initial operative sequence of movement of a fruit as the same is being picked.
Figure 8:
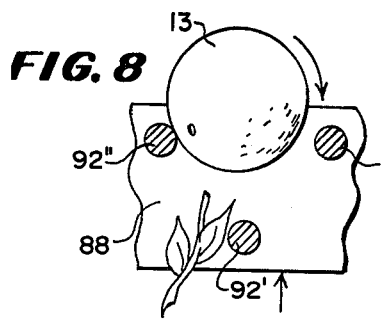
FIG. 8 is a similar view showing a progressive step of operation.
Figure 9:
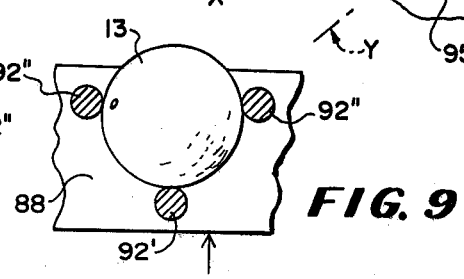
FIG. 9 likewise is a similar view showing a fruit wedged between three adjacent finger members of the invention.

Operation of the apparatus 10 with assembly 22 is as follows: The operator 36 causes tractor 14 to be positioned near a tree or the like having fruit 13 to be picked. By manipulation of controls 52, the picker boom 12 is raised so that picker head assembly 22 is moved to contact the fruit as illustrated in FIG. 1. Finger plate assembly 54 is caused to rotate counterclockwise by activating motor 70. The curved portions 96 of fingers 92 thereupon are caused to contact fruit 13 by combing the tree branches to effect picking of the fruit in the following manner. By reason of the pinched tips 98 of the fingers, the same pass through the tree branches and foliage but not the fruit. A fruit 13 initially comes in contact with a finger 92'' positioned along the line $x$. Due to the spacing 100 between fingers 92'', the fruit 13 falls or moves toward a finger 92'' adjacent the finger with which initial contact has been made. In FIGS. 6 and 7, the fruit 13 is shown falling toward a finger 92'' to the right of the finger first contacted. The falling action of the fruit toward an adjacent finger 92'' is accompanied by twisting or rotation of the fruit about its 7); 102 and thereby weakening the connection between the fruit and its stem. The fruit is rotated in progressive stages shown in FIGS. 7–9. In FIG. 8, the fruit 13 has rotated and fallen part way into the space 100. The fruit continues to rotate and fall until it is completely within space 100 between adjacent fingers 92''. Intermediary finger 92' stops fruit 13 from falling out of the space 100 (FIG. 9). In the stage illustrated in FIG. 9, the fruit has rotated relative its stem approximately 45° from its initial position (FIG. 70; thereby maximum twisting of the fruit relative its stem is achieved and the fruit even may then become separated from the stem. If separation has not been achieved, continued rotation of assembly 54 will pull the fruit from its weakened stem. The fruit is retained or lodged between fingers 92'' until the fingers are rotated to approximately the position in FIG. 5 in which the fingers are disposed in a generally horizontal plane. The fruit thereupon leaves the space 100 by the force of gravity and falls into container 32 to roll into an exit opening 104 in the bottom thereof and exit the assembly 22 by conduit 106. The picked fruit is accumulated in container 108 at the exit port of the conduit 106.

The operator 36 continues to manipulate the assembly 22 throughout the fruit laden tree for contact thereof with all of the fruit to be picked.

By reason of the removability of the plates 88 from drum 56, the assembly 22 can be adapted for picking of a wide range of types and sizes of fruit. The type of fruit to be picked dictates the spacing 100 required between fingers 92″. If a spacing different than that illustrated in the drawing is required, the operator merely removes the nuts 90 and the plates 88 and substitutes an alternate set of plates with properly spaced fingers on the drum 56.

In one working embodiment of the apparatus adapted for picking of oranges, each finger 92 is approximately 12 inches long from the welded base 95 to tip 98. The sides 86 of drum 56 are about 6 inches wide; the motor 70 is rated at 90 rpm. Follower wheel 74 is selected to reduce the rotation of plate assembly 54 to 30 rpm. The rotative speed of the plate assembly 54 can be reduced further by removing one or more plates 88 from the assembly; if two opposite plates are removed, the effective speed of the assembly through the tree branches will be 15 rpm. Further speed reduction can be achieved by varying the speed of the motor 70.

Other variations and modifications of the invention will occur to those skilled in the art.

I claim:

1. Apparatus for picking fruit from a tree comprising, a housing, an elongate drum mounted for rotative movement in the housing, the drum having a plurality of outer-facing generally planar surfaces, a first group of fruit engaging fingers disposed on each respective surface along a first line extending parallel to the elongate dimension of the drum, each pair of adjacent fingers of said first group defining a space therebetween, a second group of fruit engaging fingers disposed on each respective surface spaced from each other along a second line extending parallel to the elongate dimension of the drum spaced from said first line, adjacent ones of said first and second groups of fingers being staggered with respect to each other to provide a plurality of adjacent groups of three fingers along the length of the drum, each finger including a first generally straight portion extending normal from the drum and a second generally curved portion formed as an extension of the first portion, means for moving the housing adjacent the fruit on the tree and means for imparting rotative movement to the drum, whereby the fruit is engaged by a finger of said first group to move pivotally about the stem of the fruit to be wedged into said space and thereby is separated from the tree and deposited in the housing.

2. Apparatus as claimed in claim 1 in which the drum is of generally square cross-sectional configuration.

3. Apparatus as claimed in claim 2 including a plurality of plate members removably retained on the respective outer-facing surfaces of the drum, said fingers being formed on said plate members.

4. Apparatus as claimed in claim 1 in which the housing includes a generally curved rear and bottom wall and end plate members formed on the walls to close the sides of the housing, said drum being journalled in said end plate members.

5. Apparatus as claimed in claim 4 in which the rear and bottom walls form an open mouth between the end plate members and said fingers project beyond the mouth as the drum is rotated.

6. Apparatus as claimed in claim 4 in which the bottom wall is substantially closed to form a fruit catching container.

7. Apparatus as claimed in claim 6 including an opening in the bottom wall for discharge of the fruit deposited in the container.

8. Apparatus as claimed in claim 4 in which a portion of the rear wall is formed of wire mesh.

9. Apparatus as claimed in claim 1 in which the fingers are of generally circular cross-sectional configuration.

10. Apparatus as claimed in claim 9 in which the terminal ends of the fingers are flattened to form reduced diameter parts thereof.

11. Apparatus as claimed in claim 9 in which the terminal ends of the fingers are blunted.

12. Apparatus as claimed in claim 1 in which the fingers of said groups of three form the apexes of a triangle at the points at which they are disposed on the drum.

13. Apparatus as claimed in claim 12 in which the fingers rotate a fruit wedged therebetween through an angle of approximately 45° relative its stem during rotation of the drum.

* * * * *

UNITED STATES PATENT AND TRADEMARK OFFICE
CERTIFICATE OF CORRECTION

PATENT NO. : 3,968,631
DATED : July 13, 1976
INVENTOR(S) : Delmar C. Haines

It is certified that error appears in the above-identified patent and that said Letters Patent are hereby corrected as shown below:

Column 4, line 40, read -- stem -- for "7);"

Column 4, line 50, read -- 7); -- for "70;"

Signed and Sealed this

Fourteenth Day of December 1976

[SEAL]

Attest:

RUTH C. MASON
*Attesting Officer*

C. MARSHALL DANN
*Commissioner of Patents and Trademarks*